United States Patent
Zhang et al.

(10) Patent No.: US 10,698,936 B2
(45) Date of Patent: Jun. 30, 2020

(54) GENERATING AND USING MULTIPLE REPRESENTATIONS OF DATA OBJECTS IN COMPUTING SYSTEMS AND ENVIRONMENTS

(71) Applicants: Xinwen Zhang, San Ramon, CA (US); Rongdan Liu, San Jose, CA (US); Shuo Wang, San Jose, CA (US); Haiqing Jiang, San Jose, CA (US)

(72) Inventors: Xinwen Zhang, San Ramon, CA (US); Rongdan Liu, San Jose, CA (US); Shuo Wang, San Jose, CA (US); Haiqing Jiang, San Jose, CA (US)

(73) Assignee: HireTeamMate, Inc., Mountain View, CA (US)

( * ) Notice: Subject to any disclaimer, the term of this patent is extended or adjusted under 35 U.S.C. 154(b) by 206 days.

(21) Appl. No.: 15/847,164

(22) Filed: Dec. 19, 2017

(65) Prior Publication Data
US 2019/0188318 A1    Jun. 20, 2019

(51) Int. Cl.
*G06F 16/35*    (2019.01)
*G06F 16/38*    (2019.01)
*G06F 40/205*   (2020.01)

(52) U.S. Cl.
CPC ............ *G06F 16/353* (2019.01); *G06F 16/38* (2019.01); *G06F 40/205* (2020.01)

(58) Field of Classification Search
CPC ...... G06F 16/353; G06F 40/205; G06F 16/38; G06F 16/383; G06F 16/387
See application file for complete search history.

(56) References Cited

U.S. PATENT DOCUMENTS

| | | | |
|---|---|---|---|
| 6,816,830 B1* | 11/2004 | Kempe | G06F 40/216 704/9 |
| 7,617,176 B2 | 11/2009 | Zeng et al. | |
| 7,870,117 B1 | 1/2011 | Rennison | |
| 8,566,351 B2 | 10/2013 | Iwayama | |
| 8,725,732 B1 | 5/2014 | Jeh et al. | |
| 8,930,178 B2* | 1/2015 | Pestian | G06F 19/328 704/9 |
| 8,949,239 B2 | 2/2015 | Ruffner et al. | |
| 9,183,285 B1* | 11/2015 | Brown | G06F 16/285 |
| 2002/0022956 A1* | 2/2002 | Ukrainczyk | G06F 16/353 704/9 |
| 2010/0082620 A1* | 4/2010 | Jennings, III | G06F 16/285 707/736 |

(Continued)

*Primary Examiner* — Jorge A Casanova

(57) ABSTRACT

A data object can be represented based on multiple "tags" (e.g., multiple signatures provided as a cluster of signatures based on multiple tags of a data model). Essentially, the representation of the data object need not necessarily reflect the entire data object but it can provide a useful indication (or a signal) (e.g., "s40={computer vision, image analysis, tracking, detection, 3d}"), In addition, a data representation provided (e.g., signature or cluster of signatures) can represent multiple data objects. However, a data object can be represented by multiple tags (e.g., signatures) as well. Also, multiple tags can be used to collectively represent a data object. The tags can provide information in an organized and logically structured manner. For example, a cluster signature can be provided with strings of one or more words (e.g., keywords) concatenated with logical operators (e.g., AND, OR, NOT).

13 Claims, 17 Drawing Sheets

(56) References Cited

U.S. PATENT DOCUMENTS

| | | | |
|---|---|---|---|
| 2013/0246377 A1* | 9/2013 | Gaitonde | H04L 63/0236 |
| | | | 707/697 |
| 2015/0066939 A1* | 3/2015 | Misra | G06F 16/355 |
| | | | 707/739 |
| 2016/0203142 A1* | 7/2016 | Kawano | G06F 40/169 |
| | | | 707/728 |
| 2016/0259862 A1* | 9/2016 | Navanageri | G06F 16/955 |

* cited by examiner

Example of job cluster signatures

REQUIREMENTS
- Bachelors/Degree in Computer Science or other technology field; Typically requires 6+ years of experience in delivering enterprise-class, mission-critical, commercial, and scalable products.
- 2-3 years experience with Agile Scrum development methodologies.
- Hands on experience with Continuous Integration, and Test Driven Development.
- 2-3 years demonstrated experience with n-tier web application development and experience in latest JDK and earlier releases. Must be able to articulate experience with many of the major Java APIS (e.g. JMS, JPA, JNDI, EJB, RMI, JAX, etc.); J2EE certification a Plus
- Experience with Spring Framework, Hibernate and Struts MVC
- Experience with web services standards and related technologies (XML, JSON, REST, SOAP, WS*, AXIS, JERSEY).
- Demonstrable experience utilizing object-oriented patterns and design best practices.
- Experience working with a variety of Applications Servers and Databases (Primarily Tomcat, Oracle and DB2)
- Experience integrating with asynchronous messaging systems such as MQ Series.
- Excellent process orientation and exhibited planning, organizational and problem solving skills.
- Strong interpersonal, facilitation, and leadership skills along with effective communication (both written and verbal) skills.
- Ability to write technical design and build documentations for all aspects of a technical infrastructure.
- Broad background and solid understanding of N-tier open architectures including understanding of presentation, business, and persistence services.

Fig. 2A

Example of job cluster signatures

- A job description with requirements, responsibilities or expectations
- Cluster signatures:
  - s10={java }
  - s20= { json , xml, javascript }
  - s30= {j2ee , spring , ejb , hibernate , tomcat , struts , jersey , jndi , jms , rmi , jpa, jax}
  - S31 = {j2ee, spring, ejb, hibernate, struts}
  - S32 = {tomcat, jersey}
  - S33 = {jndi, jms, rmi, jpa, jax}
  - S34={ajax}
  - S40 ={scrum }
  - S50 = { web services, soa , rest , soap , mvc , web application development, rich web app}
  - s60 = { databases , db2, mysql}
  - S70 = {security}
  - S80 = {regression test , continuous integration}
- A cluster signature is a set of keywords, which is concatenated with logical operators (including but not limited to AND, OR, NOT)
  - The default logical operator is OR.
- A cluster signature usually specifies a particular attribute of a job, such as:
  - E.g., set of required skills, location/area, industry domain
- A job can have many cluster signatures

Fig. 2B

Example of user (candidate) cluster signatures

Staff Engineer

Staff Engineer - Seagate Technology

Superior, CO

Sponsorship required to work in the US

Work Experience

Staff Engineer
Seagate Technology

• Lead Engineer/Technical Project Manager for bring up, testing & delivery of architecture for cloud hard disk drives
• Provide leadership for technical planning, development and scrums for sprint planning of new features and bugs
• Mentor and guide colleagues with my technical knowledge on code reviews, bugs and queries

Sr. Engineer
Seagate Technology
2014 to 2017

• Heavily involved in high performance drive software design, bring-up, testing and delivery for enterprise market
• Optimized data flow and data management software for improved performance between hosts and drives
• Liaison for Microsoft to respond to questions about issues and performance concerns for customer workloads

Firmware Engineer II
Seagate Technology
2012 to 2014

• Worked in product bring-up team, developed software and fixed bugs during daily/weekly testing of drives
• Analyzed customer workloads and tweaked software for specific performance improvements before production
• Represented firmware organization during Failure Mode Effects Analysis and high priority daily product meetings

Firmware Engineer II
Seagate Technology
2011 to 2012

Fig. 3A

Example of user (candidate) cluster signatures

- Signatures:
  - s10={Staff engineer}
  - s20={Telsa Motors}
  - s30={autopilot, autonomous driving, self-driving}
  - s40={computer vision, image analysis, tracking, detection, 3d}
  - s50={opencv, qt}
  - s60={big data, data analysi}
  - s70={machine learning, deep learning, neural network}
  - s80={hibernate, spring, qt}
  - s90={matlab, php, c++, node.js, javascript, java, vc++}
  - s100={http, tcp/ip, network protocols}
- A cluster signature is a set of keywords, which is concatenated with logical operators (including but not limited to AND, OR, NOT)
  - The default logical operator is OR.
- Each cluster signature describe a set of user profile,
  - Set of skills, locations, education, industry domains, employers
- A user can have multiple cluster signatures

Fig. 3B

Example 1.0: a data model

- A set of user profiles and job descriptions
- A set of keywords KW:
    - KW = {json, j2ee, spring, ejb, hibernate, tomcat, struts, jersey, jndi, jms, rmi, jpa, jax, ajax, scrum, soa, rest, soap, mvc, web application development, rich web app, database, db2, mysql, security, regression test, continuous integration, Java, javascript, xml, web services, ...}
- Keyword dependency relation KD:
    - KD = {(j2ee, java), (spring, java), (ejb, java), (ajax, javascript), (jax, java), (jax, xml), (soa, web services), (rest, web services), (soap, web services), ...}
    - Note: (k1, k2) is in keyword dependency relation means k1 depends on k2
- A set of domains DOM:
    - DOM = {web_backend, web_frontend, web_dev, db, security, test, devops, ...}
- A set of types TYPE:
    - TYPE = {kw, framework, server, lib, method, rdbms, ...}
- A set of tags TAG:
    - TAG = {web_backend_kw, web_backend_framework, web_backend_server, web_backend_lib, ..., web_frontend_kw, web_frontend_framework, ..., db_rdbms, devops_method, ..., language, ...}
    - Note: a tag can consist of a domain and a tag (e.g., web_frontend_framework), or a general named string (e.g., language)
- A mapping function ktm: map each keyword to one or more tags:
    - ktm(json) = {language}
    - ktm(java) = {language},
    - ktm(xml) = {language},
    - ktm(javascript) = {language},
    - ktm(j2ee) = {web_backend_frameowork}
    - ktm(ejb) = {web_backend_framework}
    - ktm(tomcat) = {web_backend_server},
    - ...
    - ktm(regression test) = {test_method}
    - ktm({continuous integration} = {devops_method}
    - ...

Fig. 4A

Example 1.0: a data model (cont)

- A set of tag relations:
  - INDOM = {(web_frontend, web_dev), (web_backend, web_dev), (test, devops), ...}
  - TYPEOF = {(framework, lib), ...}
  - Yet another relation is ...

Fig. 4B

Example 1.1

- For the job description example in previous example:
  o List of keywords identified (by parsing the job description text):
    - json, j2ee , spring , ejb , hibernate , tomcat, struts , jersey , jndi , jms , rmi , jpa, jax, ajax, scrum, soa , rest , soap , mvc , web application development, rich web app, database, db2, mysql, security, regression test , continuous integration
  o List of augmented keywords:
    - java: j2ee, spring, ejb, etc are dependent on java
    - Javascript: ajax depends on javascript
    - Xml: jax depends on xml,
    - web services: soa, rest, and soap etc depend on web services
  o List of cluster signatures generated:
    - S1: Language = {java, json, xml, javascript}
    - S2: web_backend_framework = {j2ee, ejb, spring, hibernate, struts, jersey, jms}
    - S3: web_backend_server = {tomcat}
    - S4: web_backend_lib = {jndi, rmi, jpa, jax}
    - S5: Web_frontend_lib = {ajax}
    - S6: program_management_method = {scrum}
    - S7: web_dev_architecture = {soa, rest, soap, mvc, web services}
    - S8: Web_dev_kw = {web application development, rich web app}
    - S9: Db_kw = {databases}
    - S10: Db_rdbms = {db2, mysql}
    - S11: security_kw={security} (security is a domain, and kw is a type)
    - S12: test_method={regression test}
    - S13: Devops_method = {continuous integration}
    - Note: the cluster name can be any other general string, which is not critical for the invention.

Fig. 5B

Example 1.2

- List of augmented cluster with tag relations:
  - Consider (web backend, web dev) and (web frontend, web dev) are both in INDOM relation, that is "web backend" is within "web dev", and "web frontend" is within "web dev", and there is common type lib for many web frontend and web backend keywords, then create new clusters below with these keywords:
    - Consider s4 and s5, generate following signature:
      - S14: web_dev_lib = {jndi, rmi, jpa, jax, ajax}
    - Consider s2, generate the following:
      - S15: web_dev_framework = {j2ee, ejb, spring, hibernate, struts, jersey, jms}
    - Consider s3, generate:
      - S16: web_dev_server = {tomcat}
  - Consider (framework, lib) is in the TYPEOF relation, that is, framework is considered as library, add the following cluster
    - Consider s2, generate the following:
      - S17: web_backend_lib = {j2ee, ejb, spring, hibernate, struts, jersey, jms}
    - Combine s14 and s17:
      - S18: web_dev_backend_lib = {j2ee, ejb, spring, hibernate, struts, jersey, jms, jndi, rmi, jpa, jax, ajax}
  - Consider (test, devops) is in INDOM relations, and keywords "regression test" and "continuous integration" both have common type "method", create a new cluster with these two:
    - Consider s12 and s13, generate:
      - S19: test_devops_method = {regression test, continuous integration}

Fig. 6A

Example 1.2 (cont)

Filter duplicated signatures with the same set of keywords, and generate the result set of clusters as below:

- S1: Language = {java, json, xml, javascript}
- S2: web_backend_framework = {j2ee, ejb, spring, hibernate, struts, jersey, jms}
  - S15 and s17 are the same as s2
- S3: web_backend_server = {tomcat}
  - S16 is the same as s3
- S4: web_backend_lib = {jndi, rmi, jpa, jax}
- S5: web_frontend_lib = {ajax}
- S6: program_management = {scrum}
- S7: web_dev_architecture = {soa, rest, soap, mvc, web services}
- S8: Web_dev_kw = {web application development, rich web app}
- S9: Db_kw = {databases}
- S10: Db_rdbms = {db2, mysql}
- S11: security_kw={security}
- S12: test_method={regression test}
- s13: Devops_method ={continuous integration}
- S14: web_dev_lib = {jndi, rmi, jpa, jax, ajax}
- S18: web_dev_backend_lib = {j2ee, ejb, spring, hibernate, struts, jersey, jms, jndi, rmi, jpa, jax, ajax}
- s19: test_devops_method = {regression test, continuous integration}
- Note: the cluster name can be any general string, which is not critical for the invention.

GENERATING AND USING MULTIPLE REPRESENTATIONS OF DATA OBJECTS IN COMPUTING SYSTEMS AND ENVIRONMENTS

CROSS REFERENCE TO THE RELATED APPLICATIONS

This application take priority form the Provisional U.S. Patent Application No. 62/436,688, entitled: "GENERATING AND USING MULTIPLE REPRESENTATIONS OF DATA OBJECTS IN COMPUTING SYSTEMS AND ENVIRONMENTS," by Xinwen Zhang et al., filed on Dec. 20, 2018, which is hereby incorporated herein in its entirety by references for all purposes.

BACKGROUND

A data object (or an object) can include information (or data). Typically, information (or data) can be provided as textual information (or textual data). By way of example, textual information (or textual data) can be represented by a string of characters which may be encoded in computer-readable format (e.g., American Standard Code for information Interchange (ASCII). Computers can understand numbers, so an ASCII code can be provided as a numerical representation of a character such as 'a' or '@' an action of some sort A data object can, for example, be written text in a language readable by a human (e.g., a user profile, resume, a job) provided (e.g., encoded, generated, stored) in various known computer-readable formats (e.g., txt, pdf, html, json, web document).

Today, data and its usage in computing environments and systems has become prevalent in virtually all aspects of business and personal life. Moreover, usage of various forms of data is likely to continue to grow even more rapidly and more widely across all aspects of commerce, social and personal activities. As such, it is apparent that techniques for representation of data are very useful.

SUMMARY

Broadly speaking, techniques for computing environments and systems are disclosed. More particularly, techniques and systems for representation of data (e.g., data objects) in computing environments and systems are disclosed.

In accordance with one aspect, a representation of the data object can be generated based on the multiple mapped tags obtained for the data object, such that each one of the multiple mapped tags in the generated representation of the data object includes one or more of its corresponding strings of characters. The data object can be generated, for example, by obtaining a set of multiple strings of characters of the data object, and thereafter mapping each one of the multiple strings of characters of the data object to at (east one tag to obtain multiple mapped tags for the data object. For example, the representation of the data objects can include multiple signatures, such that each one of the multiple signatures in the generated representation of the data object includes one or more of its corresponding strings of characters in accordance with one embodiment.

In accordance with another aspect, a data object can be evaluated at least partly based on comparing at least one of the strings of characters of multiple tags of the data object with at least one of the multiple strings characters of another object. Metrics can be defined to measure the degree or percentage that the first data object matches the second object, based on the evaluation result. By evaluating with the same data object, one or more data objects can be ranked based on the evaluation metrics.

In accordance with yet another aspect, a search expression can be generated by obtaining a first representation of a data object that includes multiple tags for the data object such that each one of the multiple tags in the representation of the first data object is associated with one or more first corresponding strings of characters, and aggregating two or more of the multiple tags together to form a new tag. Thereafter, the search string can be generated at least partly based on the remaining tags and their corresponding strings of character.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2A depicts a job description.

FIG. 2B depicts a cluster of signatures in accordance with one embodiment.

FIG. 3A depicts a resume.

FIG. 3B depicts multiple signatures or a cluster of signatures (signature cluster) as {s10, s20, s30 . . . s100} for a document depicted in FIG. 3A in accordance with one embodiment.

FIG. 4A depicts a set of Keywords (KW), and keyword dependencies relation (KD) in accordance with one embodiment.

FIG. 4B depicts a set of tag relations, namely an "INDOM" and a "TYPEOF" are exemplified using the tags shown in FIG. 4A in accordance with one embodiment.

FIG. 5B depicts a list of keywords identified by parsing of a job description are shown in accordance with one embodiment.

FIG. 6A depicts an exemplary list of augmented clusters with tag relations in reference to list of cluster signatures S1 . . . S13 shown in FIG. 5B in accordance with one embodiment.

FIG. 6B depicts an exemplarily list of signature S1 . . . S19 with reference to signatures depicted in FIG. 5B and FIG. 6A in accordance with one embodiment.

DETAILED DESCRIPTION

Figure 1A:
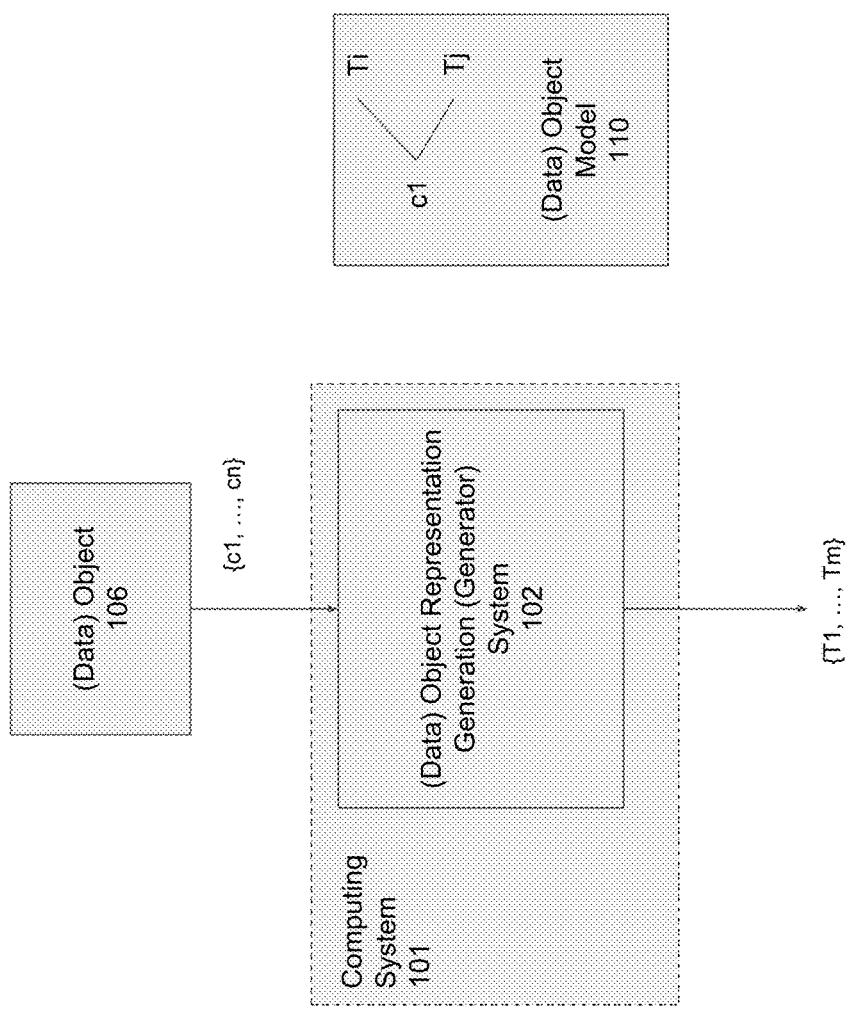
FIG. 1A depicts a computing environment including a data object representation generation system provided in a computing system (e.g., a computer) in accordance with one embodiment.

As noted in the background section today, data and its usage in computing environments and systems has become prevalent in virtually all aspects of business and personal life. Moreover, usage of various forms of data is likely to continue to grow even more rapidly and more widely across all aspects of commerce, social and personal activities. As such, it is apparent that techniques for representation of data are very useful.

Important aspects of computer environments and systems, include digital or hand-written signatures. Conventionally, a digital or a hand-written signature can be used to represent a data object. In doing so, a data object can be represented by a sequence of single bits, or an image. However, typically, the sequence of single bits or the image are unique. In other words, conventionally, two different objects nave different signatures. As such, it would be impossible or difficult to search many similar objects based the conventional signature of a single object.

On the other hand, using the entire data objects, for example, by extracting and comparing them, one by one, may not be infeasible or practical, at least in some applications and/or environments. Furthermore, conventionally, the data obtained from a data object, for example, as keywords in a document may not be logically organized. As a result, only comparing keywords may not provide a vary meaningful result, at least in some applications and/or environments. Accordingly, alternative and/or improved techniques for representation of data are needed and would be highly beneficial given the usefulness and prevalence of data representation techniques in virtually all aspects of business end personal life today, and their potentially increasing importance in the future.

There is yet another most important problem for conventional unique signature for a data object. A conventional signature uniquely identify a single object. However, in many cases, a user wants to obtain one or more signatures (or data representation) from a single object, generate search strings with the signatures, and search for many objects with the same or similar signatures. For example, a recruiter has a job description, and wants to have a search string (composed with signatures from the job description), so that she can search and identify all candidates in a database that have similar signatures. For another example, the same user may have a talent profile or a candidate resume, and wants a search string composed with signatures to search and identify all matched job descriptions in a database. Here a signature may represents one or more skill sets required by the job description, and one or more skill sets of all matched candidates, therefore it represents many job descriptions or candidate resumes which have the same skill sets, and each job description of a candidate resume may have multiple signatures, which represent many different skill sets.

In view of the foregoing and the following description, it will be appreciated that a data object can be represented based on multiple "tags" (e.g., multiple signatures provided as a cluster of signatures). Sometimes a signature is called as cluster signature in this invention, since, by its purpose, a signature semantically represents a cluster of objects that have same signature. For example, multiple signatures can be generated based on multiple "tags" of a data model. Essentially, a "tag" and/or each part of the representation of the data object (e.g., a signature) not necessary reflect the entire data object but it can provide a useful indication (or a signal), representative of at least a pan or aspect the data object and/or it can provide a scope for (or scope of) the data object. A "tag" (hereinafter referred to simply as a tag) or a part of the representation of the data object (e.g., a signature) can also provide one or more logic organizations of data as, for example, a signature of the data object can include one or more components (string of characters, keywords) that may be related.

As another exam pie, a signature for a data object can be provided as: "s40={computer vision, image analysis, tracking, detection, 3d}". As such, a Signature s40 can give a signal (or an indication) that its representative data object (e.g., a job description or a talent resume) has something related to computer vision, image analysis skill, and so on. In addition, a data representation (e.g., signature or cluster of signatures) can represent multiple data objects. A data object can, however, be represented by multiple tags (e.g., signatures) as well. In addition, multiple tags and/or signatures can collectively represent a data object. The tags and/or signatures can provide information in an organized and/or logically structured manner. Furthermore, a cluster of signatures (cluster signature) can be provided in various forms to convey additional information or indications. A cluster signature can, for example, be provided string of one or more words (e.g., keywords) concatenated with logical operators (e.g., AND, OR, NOT).

It should also be noted that a data object can be represented by multiple signatures (e.g., multiple clusters of signatures). Furthermore, signatures of data objects can be used to compare and match data objects, generate searches on data objects, etc.

In accordance with one aspect, a representation of the data object can be generated based on the multiple mapped tags obtained for the data object, such that each one of the multiple mapped tags in the generated representation of the data object includes one or more of its corresponding strings of characters. The data object can be generated, for example, by obtaining a set of multiple strings of characters of the data object, and thereafter mapping each one of the multiple strings of characters of the data object to at least one tag to obtain multiple mapped tags for the data object.

In accordance with another aspect, a data object can be evaluated at least partly based on comparing at least one of strings of characters of multiple tags of the data object with at least one of the multiple strings characters of another object. The evaluation result can be measured by some metrics, which indicate how much that these objects are matched based on the tags and strings of characters.

In accordance with yet another aspect, a search expression can be generated by obtaining a first representation of a data object that includes multiple tags for the data object such that each one of the multiple tags in the representation of the first date object is associated with one or more first corresponding strings of characters, and aggregating two or more of the multiple tags together to form a new tag. Thereafter. The search string can be generated at least partly based on the remaining tags and their corresponding strings of character.

The present invention will be readily understood by the following detailed description in conjunction with the accompanying drawings, wherein like reference numerals designate like structural elements. However, those skilled in the art will readily appreciate that the detailed description given herein with respect to these figures is for explanatory purposes as the invention extends beyond these limited embodiments.

FIG. 1A depicts a computing environment 100 including a data object representation generation system 102 provided in a computing system (e.g., a computer) 101 in accordance with one embodiment. Referring to FIG. 1A, the computing system 101 can include one or more processors and non-transitory computer readable storage medium (not shown) as will be appreciated by those skilled in the art. By way of example, data object representation generation system 102 and data object representation analyzing system 104 can be provided at least partly as computer executable code stored in the non-transitory computer readable storage medium. Those skilled in the art will also appreciate that data object representation generation system 102 can be implemented at least partly as hardware and/or a combination of hardware and software components.

In any case, the data object representation generation system 102 can obtain a set of multiple strings of characters of a data object 106. This set can be represented as: {c1, . . . , cn}. For example, the data object 106 can be or represent a job description depicted in FIG. 2A or a resume depicted in FIG. 3A. As such, the set of multiple strings of characters {c1, . . . , cn} of the data object 106 that are obtained by the data object representation generation system 102 can, for example, be a number of words or keywords (e.g., java, json, xml) effectively obtained (e.g., extracted, received as input) from a document (e.g., a job description depicted in FIG. 2A).

After obtaining the set of multiple strings of characters {c1, . . . , cn} of the data object 106, the data object representation generation system 102 can effectively map each one of the multiple strings of characters {c1, . . . , cn} of the data object 106 to one or more identifiers (herein referred to as "tags") in order to obtain multiple tags for the object 106. In other words, a set of tags: {T1, . . . , Tm} can be provided for the set of multiple strings of characters of a data object 106 ({c1, . . . , cn}). In accordance with one aspect, the tags {T1, . . . , Tm} can be provided based on the information provided in a data object model (or object model) 110 that effectively maps a siring of characters (e.g., a keyword) c1 to one or more tags {T1, . . . , Tm}.

It should also be noted that in accordance with the object data model 110 two or more strings of characters can be mapped to the same tag. In addition multiple tags can be generated for the data object 106. Generally, multiple tags {T1, . . . , Tm} corresponding to the strings of characters {c1, . . . , cn} can be used to represent the data object 106. For example, the multiple tags {T1, . . . , Tm} can be effectively used as signatures of the data object 106. In other words, multiple signatures of the data object 106 can be generated by the data object representation generation system 102 based on the multiple tags {T1, . . . , Tm}.

To further elaborate, each tag Ti end its corresponding one or more strings of characters can, for example, be grouped together to represent the data object 106 with multiple signatures or a cluster of signatures (signature cluster). Referring to FIG. 2B, A cluster of signatures is depicted for the job description (shown in FIG. 2A) in accordance with one exemplary embodiment. In this example, the tags are provided as identifiers {s10, s20, s30 . . . s80} where each one of the tags is associated with its corresponding keywords obtained from the job description (shown in FIG. 2A). Thus, the job description (shown in FIG. 2A) is effectively represented by a clusters signatures {s10, s20, s30 . . . s89}; where each one the signatures (or tags) is associated with one or more keywords. Similarly, FIG. 3B depicts multiple signatures or a cluster of signatures (signature cluster) as {s10, s20, s30 . . . s100} for a document depicted in FIG. 3A in accordance with one embodiment. Essentially, the data model 110 provides tags, tag relationships, and the mapping between keywords and tags. Signatures are composed with keywords, according to their tags and tag relationships.

It should also be noted a tag or a signature can effectively include a set of keywords, which may be concatenated with logical operators (e.g., AND, OR, NOT). The default logical operator can be an OR operation. Each one of the cluster signatures can describe a set of attributes of a data object (e.g., set of skills, locations, education, industry domains, employers). Again, a data object can have multiple signatures or a cluster of signatures. Multiple string of characters can be mapped to multiple tags.

In accordance with one embodiment, the data object representation generation system 102 can generate multiple signatures for a data object. The signatures together can represent or can be used collectively to represent the data object (e.g., a document a resume). For example, the data object representation generation system 102 can obtain a set of multiple strings of characters of the data object and map each one of the multiple strings of characters of the data object to at least one tag to obtain multiple mapped tags for the data object, such that each one of the tags it associated with at least one string of characters. For example, a data model can be used to determine one or more tags for each string of characters (e.g., a keyword in a resume). In addition, data object representation generation system 102 can determine one or more dependencies and/or relationships for the obtained multiple mapped tags based on a data model to obtain one or more additional tags, such that each one of the additional tags if associated with at least one string of characters. For example, a data model can be used to determine the relationships and dependencies for tags. The data object representation generation system 102 can the generate multiple signatures for the data object to collectively represent the data object by using the tags including the additional tags, for example, by at least using the strings of characters associated with multiple tags and using the strings of characters associated with the one or more additional tags.

Figure 1B:
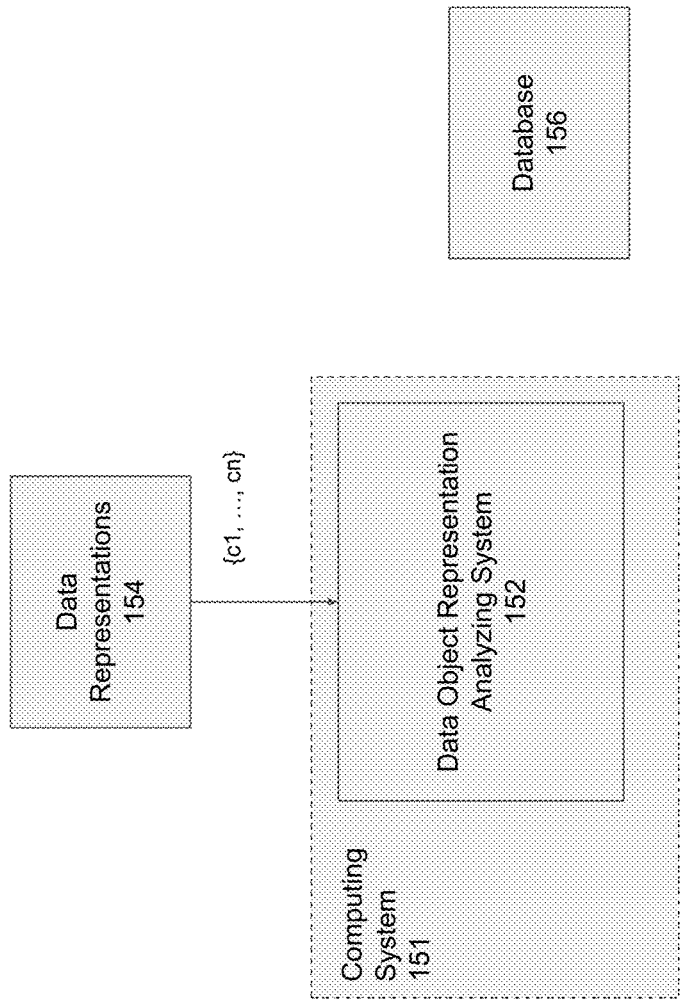
FIG. 1B depicts an computing environment including a data object representation analyzing system provided in a computing system (e.g., a computer) in accordance with one embodiment.

FIG. 1B depicts an computing environment 150 including a data object representation analyzing system 152 provided in a computing system (e.g., a computer) 151 in accordance with one embodiment. Referring to FIG. 1B, the computing system 151 can include one or more processors and non-transitory computer readable storage medium as will be appreciated by those skilled in the art. By way of example, the data object representation analyzing system 152 can at least partly be provided as computer executable code stored in the non-transitory computer readable storage medium. Those skilled in the art will also appreciate that the data object representation analyzing system 152 can be implemented at least partly as hardware and/or combination of hardware and software components. The data object representation analyzing system 152 can effectively analyze data representations 154 of various data objects, it will be appreciated that the data representations 154 can be provided based on multiple tags or multiple signatures, for example, as described above with respect to FIG. 1A. In addition, the data representations can be stored in a database 156.

Generally, the data object representation analyzing system 152 can use a data representation 154 provided with multiple tags (or signatures) to perform various analytical operations, including, for example, comparing and matching of various data objects, performing searches and facilitating searches including searches outside of the database 156 (e.g., searches on internet). As such, in accordance with one embodiment, the object representation analyzing system 154 can effectively compare data object representations with each other, including those that include multiple tags, such that each one of the multiple tags is associated with one or more first corresponding strings of characters. In accordance with another embodiment, the object representation analyzing system 152 can also compare strings of characters associated with one or more data objects with multiple tags or strings of characters of multiple tags used to represent one or more data objects. For example, the strings of characters used to represent one or more data objects can be part of multiple tags (T1, . . . , Tm) or cluster of signatures (s1, . . . , sm) generated by the data object representation generation system 102. The strings of characters associated with one or more data objects can, for example, be strings of characters {c1, . . . , cn} (shown in FIG. 1A). As such, the object representation analyzing system 152 can compare multiple tags (T1, . . . , Tm) or cluster of signatures (s1, . . . , sm) generated to represent one data object with a strings of characters {c1, . . . , cn} obtained (e.g., extracted) for another data object.

In accordance with yet another embodiment, the data object representation analyzing system 154 can also be configured to generate search strings based on data representations generated by the data object representation generation system 102 (shown in FIG. 1A). For example, the analyzing system 154 can effectively aggregate multiple lags of a data object representation to effectively generate a more condensed set of lags, such that each tag is represented by one or more strings of characters. The condensed set of tags can be used by the analyzing system 154 to form a search expression to search for a data object in an internal (e.g., database) and/or external (or global) (e.g., internet) environment. Some of the operations that can be performed by the data object representation generation system 102 will be described below in creator detail.

However, referring back to FIG. 1A, the operation of data object representation generation system 102 were explained in context of a relatively Simple data model. Using this data object model 110, all strings of characters of a data object can be effectively mapped by the data object representation generation system 102 to a set of non-empty tags (T1, . . . , Tm); and a set of signatures (s1, . . . , sn) can be generated with the strings of characters based on their mapped tags and tag relationships, where si∈s, and S is the superset of all signatures.

In the set of signatures (s1, . . . , sn), each signature s can be described by a non-empty set of strings of characters c:{c1, . . . , cm}. A string of characters can, for example, be a set of characters. For example, a keyword k in a set of keywords: k={k0, . . . , km), where ki∈KW, KW is the superset of all keywords, e.g., KW={c++, angular.js, opencv, php, node.js, hadoop, san francisco bay area, Stanford university, . . . }. In an addition, a mapping function that maps string of characters (e.g., key words) to their corresponding tags can be provided and used by the data object representation generation system 102. For example, a mapping function ktm: KW→2^TAG, can be defied, where each keyword k is tagged by one or more tags T, and TAG is the set of all tags. Function ktm(k) returns the set of tags of a single keyword, in this data model, additional definitions can be made, for example, for any two signatures s1={k10, . . . , k1i}, s2={k20, . . . , k2j}, s1⊆s2 if and only if for each ki∈s1, ki∈s2. That is, all keywords in s1 also appear in s2. This implies that if a set of keywords matches signature s1, it also matches s2.

Although the data object model 110 can be a relatively simple model, it will be appreciated that much more complex data models can be provided in accordance with other aspects. For example, the data object model can include dependencies between string of characters (e.g., words, keywords) in accordance with one aspect. Typically, these dependencies can be predefined but they may also be determined in a dynamic manner. Moreover, the dependencies can be used by the data object, representation generation system 102 to identify additional string of characters that are not found in the data object itself. An optional defined dependency can be a relation KD⊆KW X KW between keywords, where (k1, k2)∈KD indicates, for that k1 has a dependency (e.g., a strong dependency) on k2. For example, "(j2ee, java)" can indicate that "j2ee" is dependent on "java", "(angular.js; javascript)" can indicate that "angular.js" is dependent on "javascript," and so on. As Another example, "(opencv, c++)" can indicate that "opencv" is dependent on "c++". It will be appreciated that this dependency can, for example, be used to indicate that a job requirement that requires opencv, also implicitly requires or may require "c++". Yet another non-obvious relation between keywords is the co-occurrence frequency between two or more keywords, which indicates how frequent that these keywords are obtained or extracted together from the same data objects.

The data object model 106 can be even further extended by using relatively more complex tags. In accordance with another aspect, tags can provide additional information by associating a tag with one dimension (or attribute) (e.g., a domain). A domain can, for example, be defined based on a location, degree, school, experience, web frontend, web backend, big data, machine learning, cloud, devops, computer vision, uiux, mobile, data scientist, . . . }. As such, a domain can, for example indicate a scope, an area or a subject for a string of characters, a tag or a signature.

In accordance with yet another aspect, multi-dimensional tags can be provided. For example, in addition to a domain, a type can be defined. The domain and type can be used to define tags. In this way, a tag can effectively provide multiple dimensions of information. For exam pie, using a domain of "web frontend" and a type "framework, a tag can be defined as "web frontend-framework", and many keywords for web frontend development framework can be mapped to this tag, such as angular.js, react.js.

In accordance with still another aspect, one or more relationships can be defined between dimensions used to define tags. For example, a set of relations TR can be defined, where for each tr∈Tr, tr⊆DOM X DOM∪TYPE X TYPE. In other words, a relation tr can define a relationship between any two domains or types. Some exemplary embodiments include the followings are set of tag relations;

INDOM⊆DOM X DOM, where (d1, d2)∈INDOM indicates that domain d1 belongs to domain d2, for example, (web frontend, web dev)∈INDOM means that domain "web frontend" is within the domain "web dev"; and (nosql database, database)∈INDOM means that domain "nosql database" is within the domain "database".

TYPEOF(t1,t2)⊆TYPE X TYPE, where (t1, t2)∈TYPEOF indicates that type t1 is a type of type t2 For example, (framework, lib)∈TYPEOF means that a lib is usually part of a framework, or a framework usually is packaged with one or more libraries.

It should be noted that there is no need to have essential differences between tags, domains and types. For example, a tag can be a domain without having a type. Furthermore, a tag need not have a type, or a tag can be a type without having a domain. It should also be noted that a tag need not have a domain or type. A such, it may, for example, be simply an identifier (e.g., 1, S1)

Figure 1C:
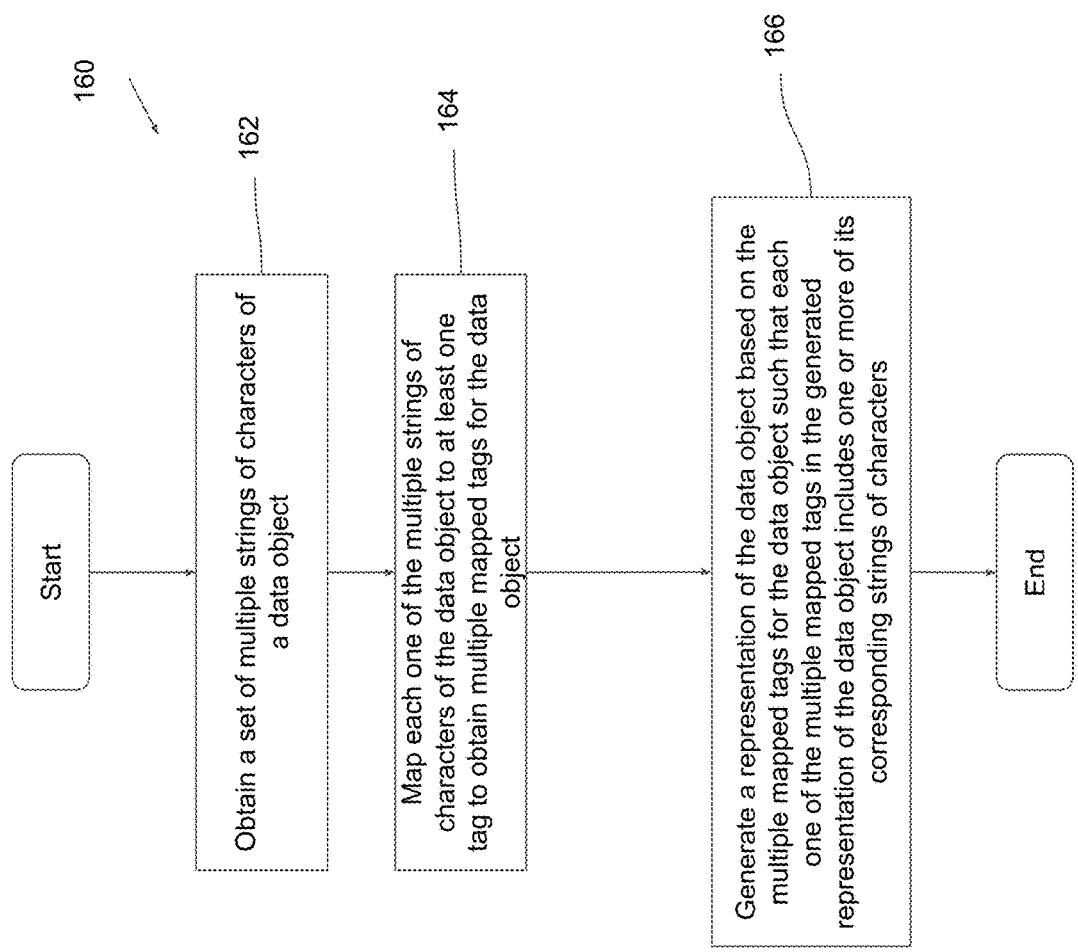
FIG. 1C depicts a method for generating a representation of a data object in accordance with one embodiment.

FIG. 1C depicts a method 160 for generating a representation of a data object in accordance with one embodiment. The data object can include textual information represented at least by multiple strings of characters. Method 160 can be implemented at least by one or more processor s configured to process executable code stored in a computer readable medium including a non-transitory computer readable storage medium storing at least executable code. For example, method 160 can be performed by the data object representation generation system 102 (shown in FIG. 1A).

Referring to FIG. 1C, initially, a set of multiple strings of characters of the data object are obtained (162). Next, each one of the multiple strings of characters of the data object ere mapped (164) to at least one tag to obtain multiple mapped tags for the data object. Finally, a representation of the data object are generated (186) based on the multiple mapped tags obtained for the data object such that each one of the multiple mapped tags in the generated representation of the data object includes one or more of its corresponding strings of characters.

It should be noted that the representation of the data object can, for example, Degenerated (168) as or with a set of signatures, wherein each signature includes at least one of the string characters. For example, a set of signatures can be generated (166) with identified multiple strings of characters, tags, and the relations between multiple strings of characters and taps. In this example, the set of signatures can collectively represent the data object such that each one of the generated multiple signatures in the generated representation of the data object includes one or more of the identified corresponding strings of characters.

It should also be noted that the at least one tag can be predefined. Also, data object can, for example, be presented, a cluster of multiple tags (e.g., cluster of signatures) wherein each tag in the cluster includes at one of the string characters. It should be noted that one or more tags can be defined based one or more dimensions defined for one or more categories of the strings of characters. For example, the one or more dimensions can be defined for the one or more categories of the strings of characters include one or more of the following: a domain and a type, wherein each one of the one or more are defined based on multiple sub-tags, and each one of the multiple sub-tags is defined based a dimension defined for the strings of characters. It should also be noted that each one of the one or more dimensions can include multiple sub-tags (e.g., one or more tags consist of one or more of the multiple sub-tags). The string of characters can, for example, be and/or can represent one or more keywords. The data object can be and/or cars represent a document (e.g., a job description, a resume, a profile, a criteria, and a matching criteria.

Although not shown in FIG. 1C, the method 166 to generate signatures with identified strings or characters (162) and their corresponding tags (164) can be implemented by clustering all strings of characters with tags. As one embodiment, all strings of characters that are mapped to the same tag with function ktm are grouped together and thus a signature can be generated. For example, all keywords that are tagged as web frontend_framework forms a single cluster signature. Note that each string of characters can be mapped to multiple lags, therefore multiple signatures can be generated with all possible strings of characters and each string of characters can appear m multiple cluster signatures. There can be logical operators for all strings of characters in a signature, with a default one (e.g, the default logical operator is OR).

Although not shown in FIG. 1C, method 160 can also be implemented to determine for each one the multiple strings of characters of the data object whether to add at least one additional string of characters to the set of multiple strings of characters of the data object. It should be noted that the one or more additional string of character need not be in the set of multiple strings of characters. As a result, one or more additional string of characters not present in set of multiple strings of characters can be added to the set of multiple strings of characters of the data object when it is determined to add the at least one additional string of characters to the set of multiple strings of characters of the data object.

Furthermore, although not shown in FIG. 1C, it should be noted that one or more additional string of characters can be identified, for example, based on one or more dependencies defined for one or more of the string of characters, where the dependencies are defined in the data model (see FIG. 1A). In addition, generating (166) the representation of the data object based on the one or more tags for the data object can further comprises: for each one of the one or more tags, group together each one of its corresponding string of characters, thereby generating one or more tags such that each one of the tags is associated with one or more strings of characters from the set of multiple strings of characters of the data object; and eliminating one of the one or more tags when its corresponding string of characters are the same as another one of the of the more of more tags.

Furthermore, although not shown in FIG. 1C, it should also be noted that method 160 can also be implemented to identify one or more additional tags based on one or more defined relationship with at least one of the one or more tags, and using the one or more additional tags to generate representation of the data object. For example, each one of the one or more tags and each one of the additional tags can be used to collectively to represent the data object.

Figure 1D:
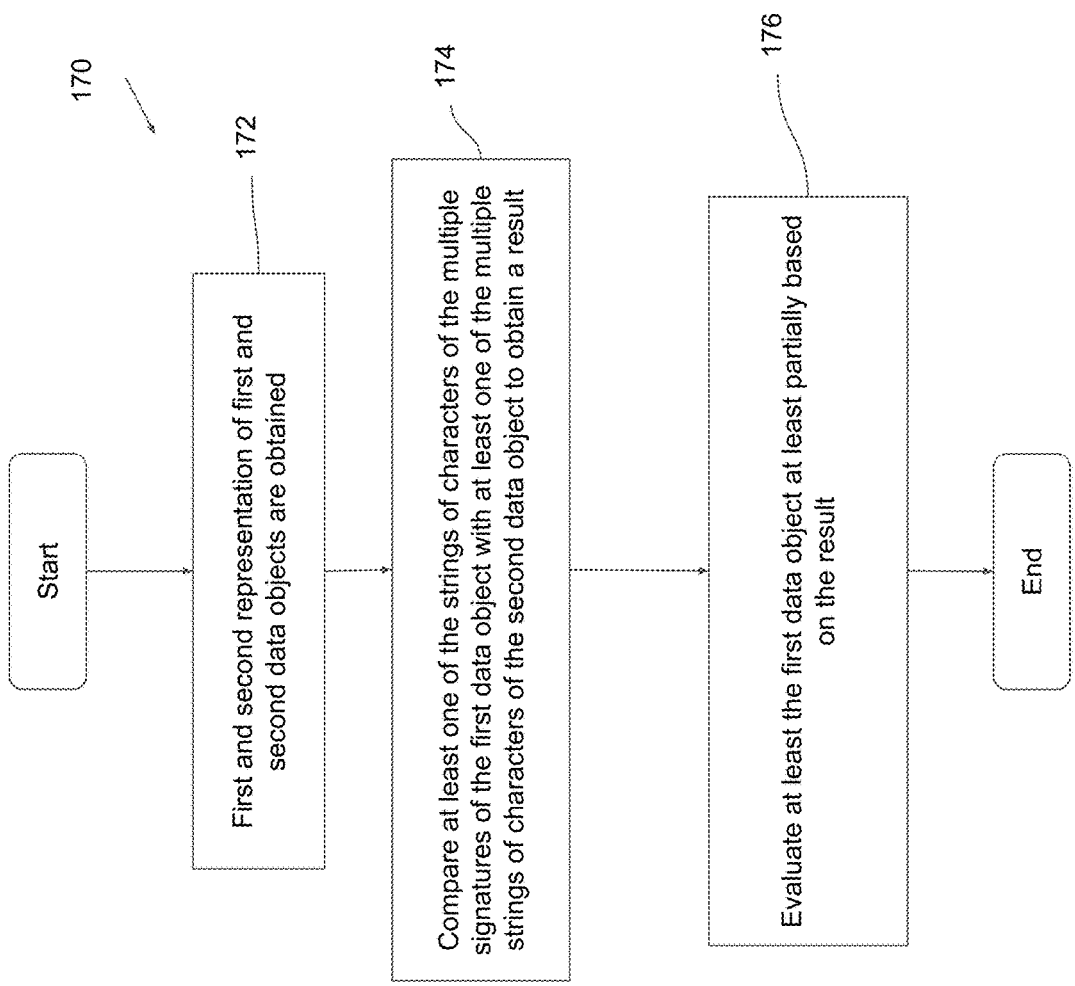
FIG. 1D depicts a method for evaluating a representation of a data object in accordance with one embodiment.

FIG. 1D depicts a method 170 for evaluating a representation of a data object in accordance with one embodiment. The data object can include textual information represented by multiple strings of characters. Method 170 can be implemented at least by one or more processors configured to process executable code stored in a computer readable medium including a non-transitory computer readable storage medium storing at least executable code. For example, method 170 can be performed by the data object analyzing system 152 (shown in FIG. 1B).

Referring to FIG. 1D, initially, first and second representation of first and second data objects are obtained (172). It should be noted that first representation of the data object can include multiple tags for the data object, such that each one of the multiple Lags in the representation of the first data object is associated with one or more first corresponding strings of characters, and the second representation of the second data object includes multiple strings of characters. It should also be noted that the representation of the data object can, for example, be generated as or with a set of signatures, wherein each signature includes at least one of the string characters. For example, a set of signatures can be generated with identified multiple strings of characters, tags, and the relations between multiple strings of characters and tags. In this example, the set of signatures can collectively represent the data object such that each one of the generated multiple signatures in the generated representation of the data object includes one or more of the identified corresponding strings of characters.

Referring back to FIG. 1D, next, at least one of the strings of characters of the multiple tags of the first data object is compared (174) with at least one of the multiple strings characters of the second data object to obtain a result. Finally, at least the first data object is evaluated (176) at least partly based on the result.

Although not shown in FIG. 1D, method 170 can, for example, be additionally implemented to obtain a second representation of a second data object, wherein the second representation of the second data object includes second multiple tags for the data object, such that each one of the second multiple tags in the representation of the second data object is associated with one or more second corresponding strings of characters, compare at least one the first tags with its first corresponding strings of characters with least one the second tags with is corresponding strings of characters to obtain the result, and evaluate at least the first data object at least partly based on the result. In addition, method 170 can, for example, be further implemented to determine how many of the strings of characters, tags and/or signatures of the first data object match the strings of characters, tags and/or signatures of second first data object, and determine a degree or percentage of matching between the first and second data objects.

Figure 1E:
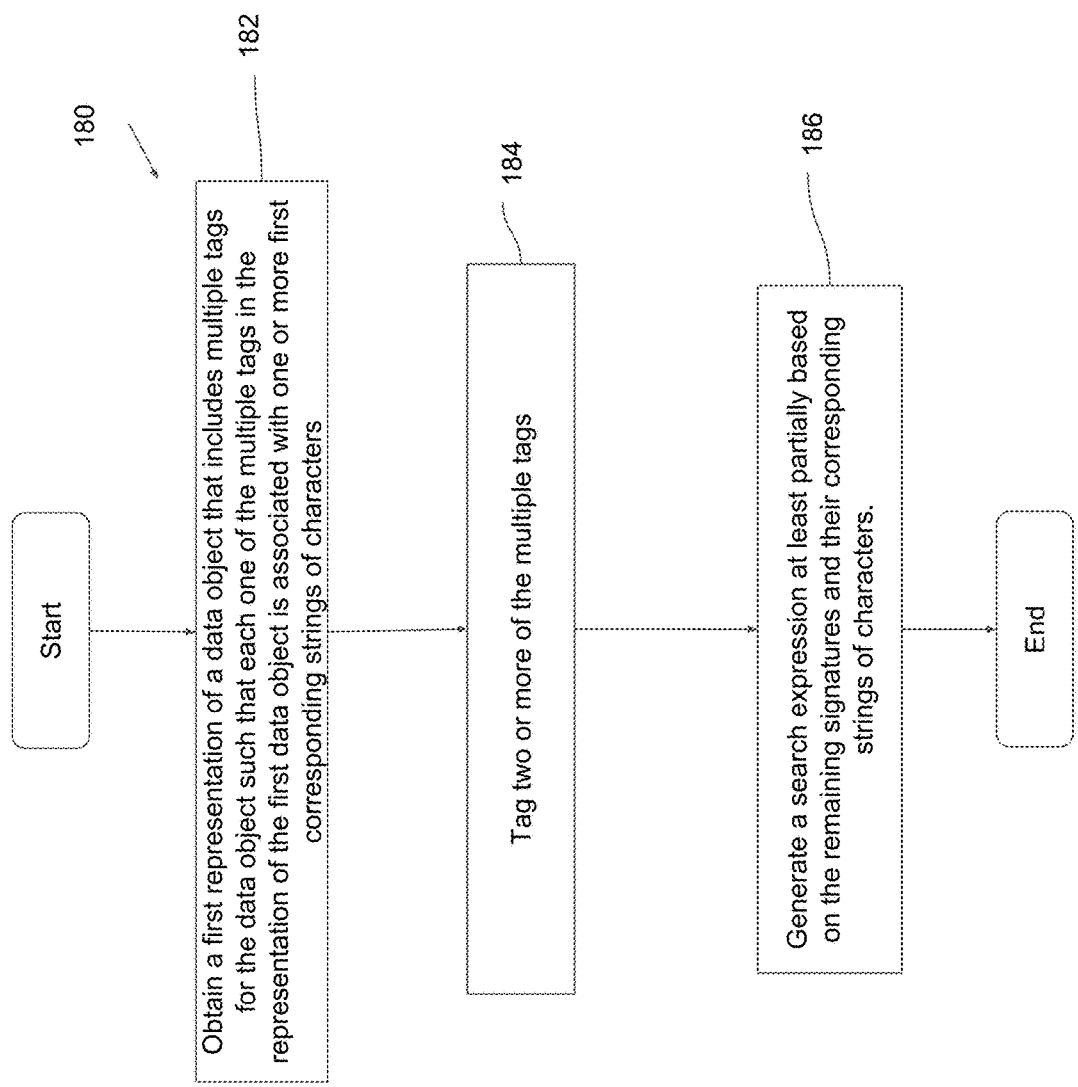
FIG. 1E depicts a method for generating a search expression for a data object in accordance with one embodiment.

FIG. 1E depicts a method 180 for generating a search expression for a data object in accordance with one embodiment. The data object can include textual information represented by multiple strings of characters. Method 180 can be implemented at least by one or more processors configured to process executable code stored in a computer readable medium including a non-transitory computer readable storage medium storing at least executable code. For example, method 180 can be performed by the data object analyzing system 152 (shown in FIG. 1B).

Referring to FIG. 1E, a first representation of a data object in obtained (182). The first representation of the data object can include multiple tags for the data object such that each one of the multiple tags in the representation of the first data object is associated with one or more first corresponding strings of characters. It should also be noted that the representation of the data object can for example, be generated as or with a set of signatures, wherein each signature includes at least one of the string characters. For example, a set of signatures can be generated with identified multiple strings of characters, tags, and the relations between multiple strings of characters and tags. In this example, the set of signatures can collectively represent the data object such that each one of the generated multiple signatures in the generated representation of the data object includes one or more of the identified corresponding strings of characters.

Referring back to FIG. 1E, next, two or more of the multiple tags are tagged (184) together to form a new tag. Finally, a search expression is generated at least partially based on the remaining tags and their corresponding string of characters.

FIGS. 4A-B depict an example of a data model in accordance with one embodiment. In this example, keywords are used as an example of strings of characters. Referring to FIG. 4A, a set of Keywords (KW), and keyword dependencies relation (KD) are exemplified in accordance with one embodiment. In addition, two dimensions, namely, a set of Domains (DOM), and a set of types (TYPE) are used to constructs a set of tags (TAG) by concatenating domains with types. Furthermore, a mapping function (ktm) that maps each keyword to one or more tags is exemplified using the tags and keywords also depicted in FIG. 4A.

Referring now to FIG. 4B, a sat of tag relations, namely an "INDOM" and a "TYPEOF" are exemplified using the tags shown in FIG. 4A in accordance with one embodiment.

Figure 5A:
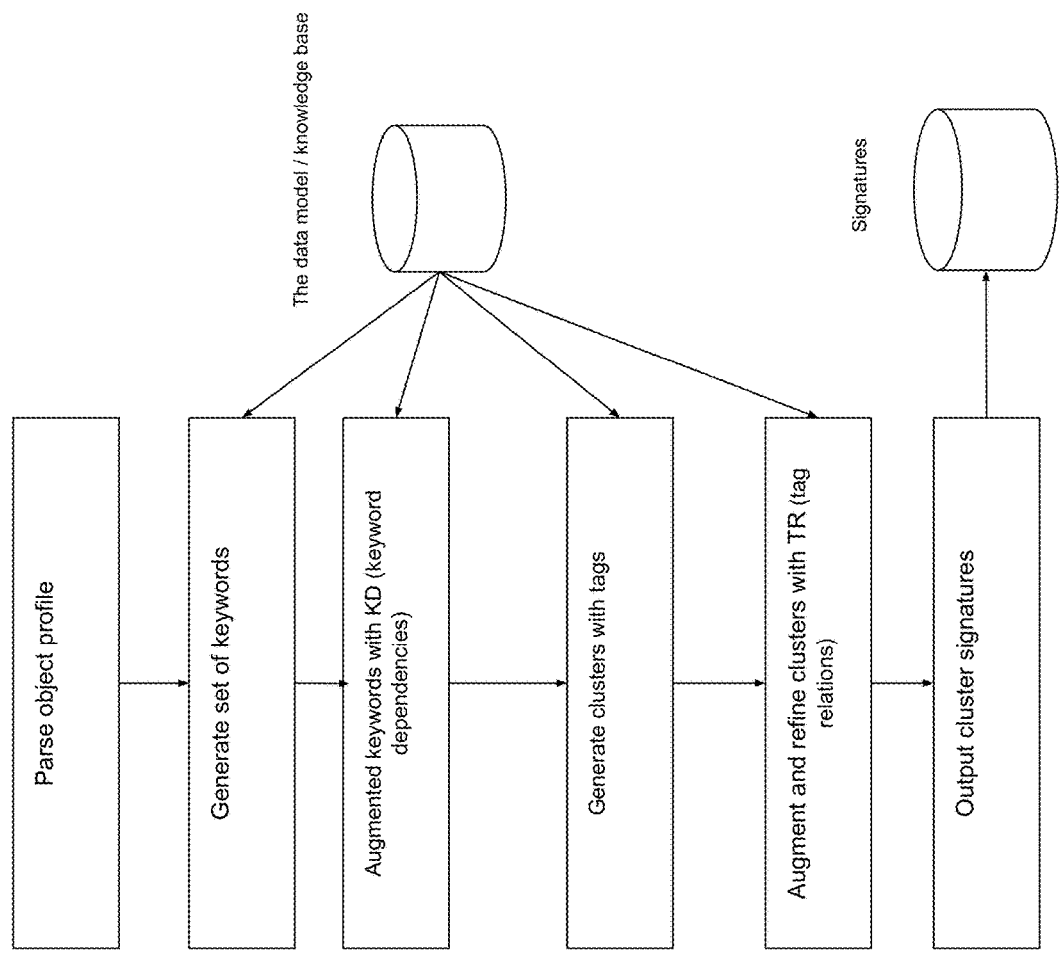
FIG. 5A depicts a method for representing a data object (or object profile) in accordance with one embodiment.

FIG. 5A depicts a method for representing a data object (or object profile) in accordance with one embodiment, initially, an object profile is parsed. Then, a set of keywords is generated by parsing the object profile. Referring now to FIG. 5B, a list of keywords identified by parsing of a job description are shown in accordance with one embodiment. Next, keywords are augmented with keyword dependencies. In other words, keyword dependencies (e.g., keyword dependencies as shown in the data model of FIG. 4A) can be used to identify additional keywords that can be effectively added to the set of keywords generated by parsing the object profile. In other words, the set of keywords is augmented by KD (keyword dependencies), i.e., for any keyword k∈K, if (k, x)∈KD, then K=K∪{x}, then, x is appended to K. That is, if a keyword k is identified in this object, and it is dependent on another keyword x, then x is also included in the keyword set of the object.

Referring to FIG. 5B, a list of augmented keywords are exemplified. Again, keyword dependencies (e.g., keyword dependencies as shown in the data model of FIG. 4A) can be used to identify additional keywords that can be effectively added to the set of keywords generated by parsing the object profile.

Referring back to FIG. 5A, after augmenting the keywords, cluster signatures can be generated based on the augmented keywords using the tags Cluster signatures can be generated using a mapping function, for example, a mapping function ktm that maps keywords to one or more tags as shown in the data model depicted in FIG. 4A. Referring now to FIG. 5B, a list of cluster signatures that can be generated are exemplified as S1, S2 . . . S13. It should be noted that the list of cluster signatures can, for example, be generated using the list of augmented keywords (also shown in FIG. 5B). In other words, cluster set C can be generated based on the ktm mapping function Specifically, all keywords mapped to the same tag by ktm function can be included in the same signature in the cluster signature. Optionally, a cluster or a signature (e.g., S1) can be identified by its tag name of all its keywords, e.g., domain_type or Language for S1). It should be noted that each cluster or signature (e.g., S1, . . . S13) may have multiple keywords and each keyword may be in multiple cluster signatures.

Referring back to FIG. 5A, after Signature clusters (e.g., S1, S2, . . . S13 shown in FIG. 5B) have been generated, the signature clusters can be further processed, by augmenting and refining them before they are output. Furthermore, although not shown in FIG. 5A, logical operators can be applied in cluster signatures. In addition, cluster signatures can be stored and indexed.

Signature clusters can be augmented based on tag relations (TR), Again, example of TR relations are shown in the portion of a data model depicted in FIG. 4B as INDOM and TYPEOF. In other words, for each cluster c∈C, and for each keyword k∈c, if there is keyword x such that (dom(ktm(k)), dom(ktm(x)))∈INDOMAIN and type(ktm(k))∩ type(ktm (k))!=null, then generate a new cluster c'=c∪{x}. That is, if there is a keyword which has INDOMAIN relation with another keyword m c, and both of them a common type, then create a new cluster keyword x and the original cluster. In addition, for each cluster c∈C and for each keyword k∈c, if there is keyword x such that (type(ktm(k)), type(ktm(x))) ∈TYPEOF, then generate a new cluster c'=c∪{x}. That is, if there is a keyword which has a TYPEOF relation with another keyword in c, then create a new cluster with keyword x and the original cluster. It should be noted that these operations can be are done recursively so that all possible clusters are generated, FIG. 6A depicts an exemplary list of augmented clusters with tag relations in reference to list of cluster signatures S1 . . . S13 shown in FIG. 5B in accordance with one embodiment. Referring to FIG. 6A, a new signature S14 constructed in consideration of INDOM relationship of tags of S4 and S5, and so on.

Although not shown in the method depicted in FIG. 5A, it should be noted that the cluster signatures can be filtered and aggregated. For example, signatures with the same set of keywords can be filtered to eliminate duplication.

FIG. 6B depicts an exemplarily list of signature S1 . . . S19 with reference to signatures depicted in FIG. 5B and FIG. 6A in accordance with one embodiment.

Furthermore, logical operator can be applied keywords in clusters (Although not shown in the method depicted in FIG. 5A). Keywords in a duster can be concatenated with logical operators (e.g., AND, OR, NOT). For example, s1={a AND b AND c}, s2={c OR f OR z NOT d}. There can be a default operator (e.g., OR) As noted above, signatures or cluster signatures can be generated and saved. A signature can be considered as a cluster with a list of keywords, cluster signatures can be indexed. Cluster signatures can be indexed based on tag names, which can be further indexed, for example, by domain and/or type names. Cluster signature can be saved virtually in any format, e.g., file, databases, memory.

Other aspects pertain to evaluating or analyzing data objects by using one or more data representations. The data representation can, for example, be provided as one or more cluster signatures generated with multiple tags (e.g., clusters of signatures S1, S2 . . . S13 shown in FIG. 5B) in accordance with one or more aspects.

Figure 7:
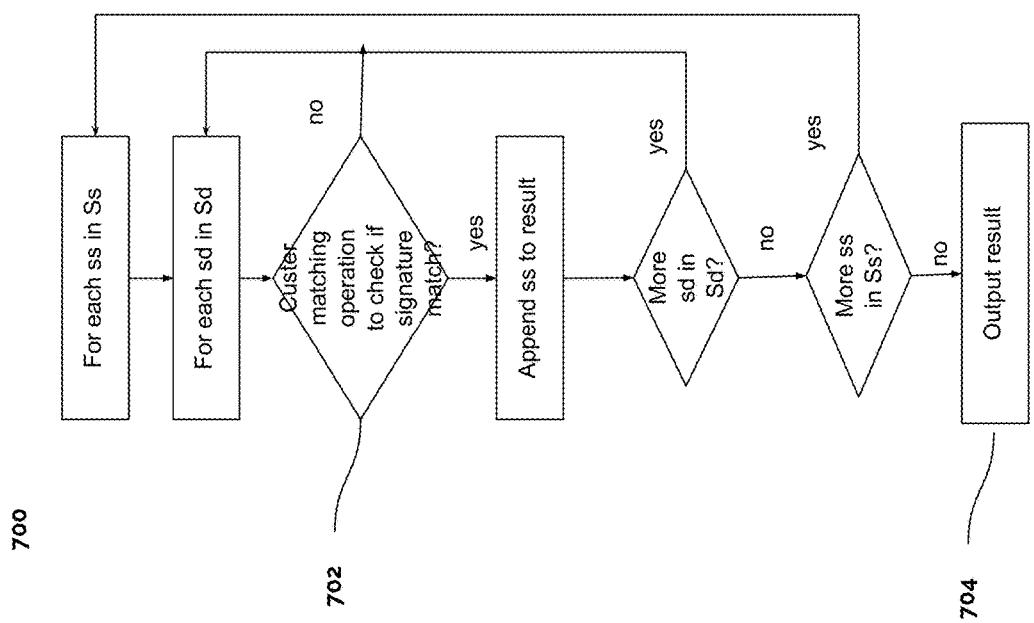
FIG. 7 depicts a cluster signature matching (or matcher) method for matching and/or ranking data objects based on cluster signatures in accordance with one embodiment.

To further elaborate, FIG. 7 depicts a cluster signature matching (or matcher) method 700 for matching and/or ranking data objects based on cluster signatures in accordance with one embodiment. Generally, the cluster signature matching method 700 can take an object profile, generate cluster signatures, for example, by using the data representation system in FIG. 1C or the example cluster signature leaner in FIG. 5A, and match the signatures with other objects signatures in database. The signature matching method 700 can further be described as follows. The method 700 takes a set of cluster signatures S from an object, find all objects whose signatures match S, and rank them based on a set of matching metrics. The general principle for method 700 is to match as much signatures as possible with a set of rules, and rank the objects with the degree or percentage of the matches.

In one embodiments of cluster signature matching method 700, s can be a user profile, and D can be many job descriptions, the output can be a set of ranked job descriptions that best fit the user profile. In another embodiment, s can be a job description, and D can be many user profiles, the output can be a set of ranked user profiles that best fit the job description.

The overall process for method 700 is described as follows.
Operation 1: for each d in D, apply cluster matching operation (702) on (s, d), the result is a matching degree between s and d, which is a metrics describing how much s and d are matched.

That is, for an object s and an object d, apply cluster matching operation on them, and generate a degree of how much these two are matched.
  in one embodiment, the matching degree is the number of matched cluster signatures of s with all keywords of d.
  In another embodiment, the matching degree is the percentage of matched cluster signatures of d with all keywords of s.
  In yet another embodiment, the matching degree is the number of matched cluster signatures among all signatures of s and d.
  In still another embodiment, the matching degree is the number of keywords in s that matching any signature of d
  In another embodiment, the matching degree is the number of keywords in d that matching any signature of s Operation 2: after all objects in D have been effectively evaluated (matched) with s, rank, the matched objects based on the matching degree an output (704) the result.

Cluster matching operation (702) depicted in FIG. 7 can, for example be provided as a signature matching operation between a signature and a set of keywords (ss, kws) in accordance with one embodiment. The signature matching operation can be described as follows:
  Input: all cluster signature of s, and all keywords of d
  Output: cluster matching degree between s and d
  Processing:
    Recursively apply signature matching operations with alt signatures of s and d
      As embodiments, there are 3 types of primitive signature matching operations:
        With a signature of s, and all keywords of d
        With all keywords of s, and a signature of d
        With s signature of s, and a signature of d
For single operation, if the operation return true, then a match is found. The cluster matching degree between (s, d) is a metrics that describes how much s and d are matched. As embodiments:
  It is the total number of matched signatures between s and d,
  It is the number or percentage of matched signatures of s
  It is the number or percentage of matched signatures of d
  It is the number or percentage of unique keywords in s that match any signature in d
  It is the number or percentage of unique keywords in d that match any signature in s
Optionally, matching results can be filtered with cluster matching requirements, either based on keyword or TAG value, for example, e.g., a particular location, a company name (keyword), a skill (keyword), or autopilot (domain).
It should be noted that virtually any signature matching options that fakes virtually any number of signatures and virtually any number of keywords, and return virtually any type of result can be provided.

As another example, the cluster matching operation (702) depicted in FIG. 7 can be provided as a signature matching operation with a signature ss and a set of keyword kws in accordance with another embodiment. The signature matching operation can be described as follows:
  Input: a signature ss, and a set of keywords kws
  Output: True if ss and kws are matched. False otherwise.
  Processing:
    If the set of keywords kws satisfies the logical operation of ss, then returns true.

Otherwise, return false

It should be noted that virtually any signature matching options that takes virtually any number of signatures and virtually any number of keywords, and return virtually any type of result can be provided.

Examples:

ss={a, b, c}: kws={a, x, y}, a signature matching operation on ss and kws return is true, Note: by default, all keywords are concatenated by "OR" operator in a signature.

ss={a AND b OR c}, kws={a, x, y}, clustering operation on ss and kws return false;

It should be noted that virtually any signature matching options that takes virtually any number of signatures and virtually any number of keywords, and return virtually any type of result can be provided.

As yet another example, the cluster matching operation (702) depicted in FIG. 7 can be provided as a signature matching operation with a set of keyword kws and a duster signature sd:

Input: a set of keywords kws, and a signature sd
Output: True if kws and sd are matched, raise otherwise,
Processing:
The same as above.

As still another example, a signature matching operation with two signatures ss and sd can be described as follows;

input: two signatures ss and sd, with their keywords and tags
Output: True if ss and sd are matched. False otherwise,
Processing:
If there is ONE set of keywords that satisfies the logical operation of sd but not ss, returns false.
For ANY set of keywords, if it satisfies both sd and ss, return true;

As another embodiment, cluster matching between ss and sd return true if there is certain number (a threshold) of common keywords among them.

Examples:

ss={a, b, c}, sd={a, b}, clustering operation on ss and sd is true; Note: by default, all keywords are concatenated by "OR" operator in a signature.

ss={a AND b OR c AND d}, sd={a, b, c}, clustering operation on ss and sd is false because set of keywords {a, c} satisfies sd but not ss;

It should be noted that virtually any signature matching options that takes virtually any number of signatures and virtually any number of keywords, and return virtually any type of result can be provided.

As another example, a Cluster matching degree (cmd) between any two objects is described as follows:

cmd is a measurable metric to measure the matching degree between two objects (s, d).

It should be noted that virtually any type of cluster matching degree can be provided, once it is comparable. Exemplary embodiments include:

cmd(s, d) is the number of matched signatures of s with all keywords of d.

cmd(s, d) is the number of percentage of matched signatures of d with all keywords of s.

cmd(s, d) is the number of matched signatures among of signatures from s and d.

cmd(s, d) is the number or percentage of unique keywords in s that match any signature in d cmd(s, d) is the number or percentage of unique keywords in d that match any signature in s Optionally, matching results can be filtered with cluster matching requirements, either based on keyword or TAG value, for example, e.g., a particular location, a company name (keyword), a skill (keyword), or auto-pilot (domain).

An example of ranking of objects based on cluster matching degree is described as follows:

Ranking of objects based on cluster matching degree

For objects and objects d1 and d2, the ranking of d1 is higher than the ranking of d2 if the cmd(s, d1)>cmd(s, d2)

E.g., s is a user, and d1 and d2 are two job descriptions

E.g., s is a job description, and d1 and d2 are two user profiles.

The ranking of objects based on cluster matching degree affects search/match result An example of aggregating cluster signatures is described as follows:

The overall goal is to aggregate several signatures into one.

Method:

A keyword can be in multiple signatures

In previous example, ajax is in both signatures of s45, s5, s14, s18

For each keyword of the input object, keep it in single cluster signature, and remove if from other signatures Several rules to decide which signature that a keyword is assigned:

Keep the keyword in the signature with largest number of keywords among all signatures which have this keyword.

For example, ajax and j2ee are kept in signature s18 since has largest number of keywords among all other signatures that have ajax and j2ee.

Similarly, regression test is kept in s19.

Keep the keyword in certain domain or types and never move to other domains or types For example, keyword with type "kw" is not moved to a cluster with keyword with is not "kw".

Move the keyword to a cluster with the same domain

E.g., tomcat is in web_backend_server cluster, and it can be moved to web_backend_lib, and then moved to web_dev_lib Drop (eliminate) signatures with small number of keywords, such as security_kw, program_management.

Virtually any other rule can be provided to aggregate signatures, applies these rules recursively until there is no change in result signatures.

An aggregated cluster signatures using previous example can be described as follows:

s1={json, java, xml, javascript} s20={j2ee, spring, ejb, hibernate, tomcat, struts, jersey, jndi, jms, rmi, jpa, jax}

Aggregated from s2, s3, s4, s5, s14, s18

S30={web services, soa, rest, soap, mvc, web application development, rich web app}

Aggregated from s7 and s8 s40={databases, db2, mysql}

Aggregated from s9 and s10

S50={regression test, continuous integration}

Aggregated from s12, s13, s19

Dropped signatures: s6, s11,

One embodiment of generating a search (e.g., boolean search formula) is described below: With aggregated cluster signatures, apply logical operator to generate a search (e.g., a boolean search string).

One exemplary embodiment:
For each signature, use logical OR to concatenate all keywords in the signature
Use logical AND to concatenate all signatures
Example: the result boolean search string is:
(Java OR json OR xml OR javascript) AND (j2ee OR spring OR ejb OR hibernate OR tomcat OR struts OR jersey OR jndi OR jms OR rmi OR jpa OR jax) AND (web services OR soa OR rest OR soap OR mvc OR web application development OR rich web app) AND (databases OR db2 OR mysql) AND (regression test AND continuous integration)

Those skilled in the art will readily appreciate that generation and analysis of data object representations can be effectively integrated and provided in one system. As such, a data object representation generator system (e.g., data object representation generator system 102 of FIG. 1A) and a data object representation analyzing system (e.g., data object representation analyzing system 152) can be integrated together provided. By way of example, FIG. 8 depicts an architectural 800 that includes a cluster signature learner and matcher the can respectively generate representations and analyze data objects in accordance with one embodiment.

Figure 8:
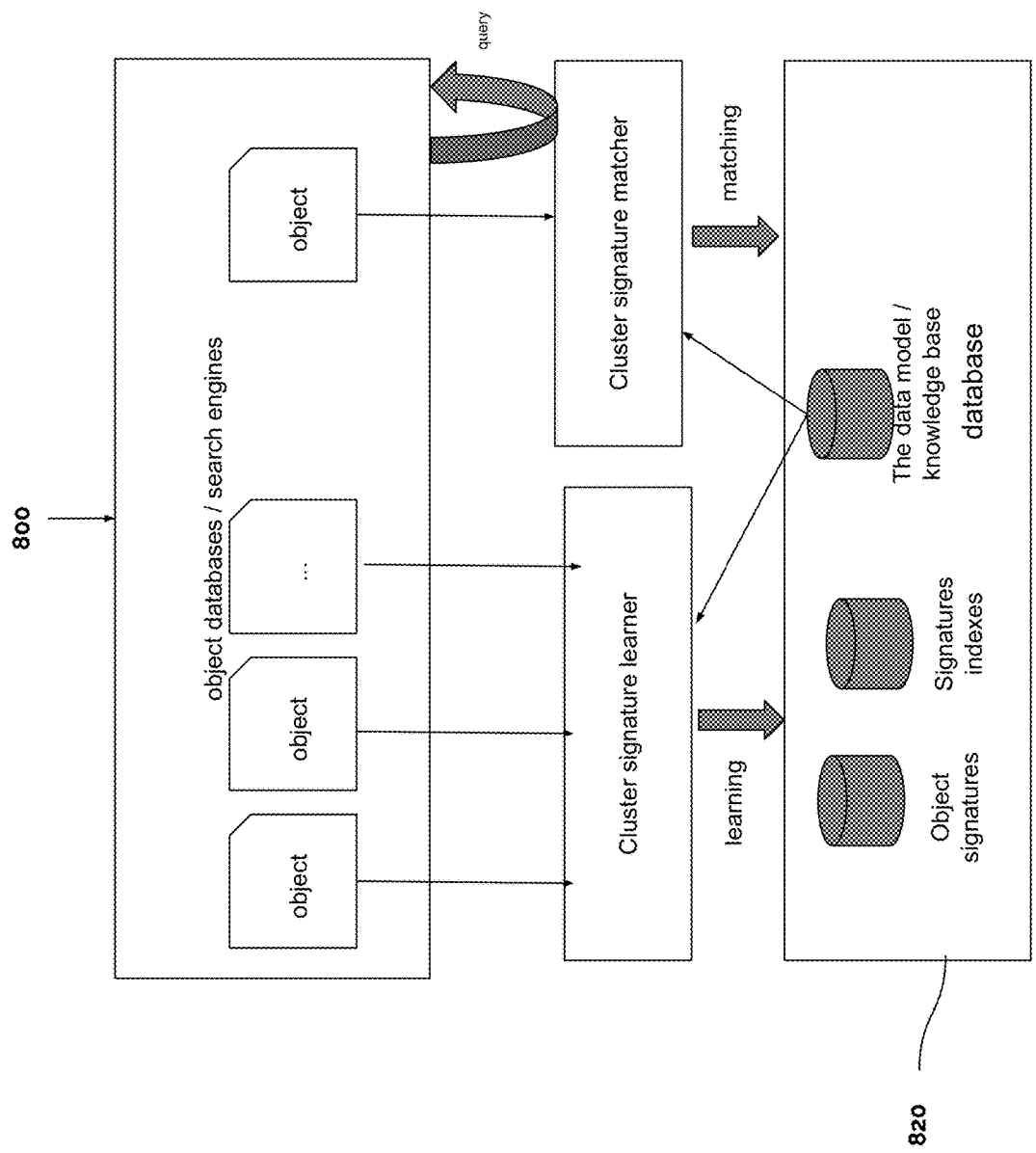
FIG. 8 depicts an architectural that includes a cluster signature learner and matcher the can respectively generate representations and analyze data objects in accordance with one embodiment.

Although not shown in FIG. 8, it should be noted that there are many different ways to implement the data representation storage, indexing, and data model generation and storage (820) as those skilled in the art will readily appreciate. For example, virtually all the parts needed to implement a data representation, including the data model, can be stored and indexed in a relational database management system (RDBMS) such as MySQL or SQL Server. In addition, various techniques to store and index data signatures and data models can be utilized in accordance with one or more embodiments. For example, in one embodiment (820) a graph for the signatures can be generated, where the nodes of the graph are tags and/or strings of characters of s data object, and the edges of the graph are relations between tags and strings of characters (e.g., keywords). Each edge can be further weighted by the frequency of co-existing of tags and/or strings of characters in the same data objects, among all data objects. One method of analyzing and evaluating a first data object with a second data object can be to identify nodes, edges, and sub-graphs in the first data object's signature graph with the tags or strings of characters of the second data object. Data objects can be further ranked based on the matched number of nodes and/or edges, the size of matched sub-graphs, or the weight of matched edges.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program m question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM EEPROM, and flash memory devices; magnetic disks, e.g., infernal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer that includes one or more physical processors configured to execute executable code to generate multiple signatures to collectively represent a data object, wherein the data object includes textual information represented at least by multiple strings of characters, and wherein the one or more physical processors are further configured to:
   obtain a set of multiple strings of characters of the data object;
   map each one of the multiple strings of characters of the data object to at least one tag to obtain multiple mapped tags for the data object, wherein each one of the tags it associated with at least one string of characters;
   determine one or more dependencies and/or relationships for the obtained multiple mapped tags based on a data model to obtain one or more additional tags, wherein each one of the additional tags it associated with at least one string of characters;
   generate multiple signatures for the data object to collectively represent the data object by at least using the strings of characters associated with multiple tags and using the strings of characters associated with the one or more additional tags, wherein the one or more tags are defined based one or more dimensions defined for one or more categories of the strings of characters, and the one or more dimensions defined for the one or more categories of the strings of characters include one or more of the following: a domain and a type; and
   wherein each one of the one or more dimensions further comprises:
      multiple sub-tags, and the one or more tags consist of one or more of the multiple sub-tags.

2. A computer-implemented method of generating a representation of a data object, wherein the data object includes textual information represented at least by multiple strings of characters, wherein the computer-implemented method is implemented at least by one or more processors, and wherein the computer-implemented method comprises:
   obtaining a set of multiple strings of characters of the data object;
   thereafter, mapping each one of the multiple strings of characters of the data object to at least one tag to obtain multiple mapped tags for the data object;
   generating a representation of the data object based on the multiple mapped tags obtained for the data object, such that each one of the multiple mapped tags in the generated representation of the data object includes one or more of its corresponding strings of characters, wherein the tags are defined based one or more dimensions defined for one or more categories of the strings of characters, wherein the one or more dimensions defined for the one or more categories of the strings of characters include one or more of the following: a domain and a type; and
   wherein each one of the one or more dimensions further comprises:
      multiple sub-tags, and the one or more mapped tags consist of one or more of the multiple sub-tags.

3. The computer-implemented method of 2, wherein the computer-implemented method further comprises:

for each one the multiple strings of characters of the data object, determining whether to add at least one additional string of characters to the set of multiple strings of characters of the data object, wherein the one or more additional string of character are not in the obtained set of multiple strings of characters; and adding one or more additional string of characters to the obtained set of multiple strings of characters of the data object when the determining determines to add the at least one additional string of characters to the set of multiple strings of characters of the data object.

4. The computer-implemented method of 3, wherein the computer-implemented method further comprises:

identifying one or more additional tags based on one or more defined relationship with at least one of the one or more tags; and using the one or more additional tags to generate representation of the data object.

5. The computer-implemented method of 3, wherein the method further comprises:

using each one of the one or more tags and each one of the additional tags to collectively to represent the data object.

6. The computer-implemented method of 2, wherein the computer-implemented method further comprises:

identifying the one or more additional string of characters based on one or more dependencies defined for one or more of the string of characters.

7. The computer-implemented method of 2, wherein the generating of the representation of the data object based on the one or more tags for the data object further comprises:

for each one of the one or more tags, group together each one of its corresponding string of characters, thereby generating one or more tags such that each one of the tags is associated with one or more strings of characters from the set of multiple strings of characters of the data object.

8. The computer-implemented method of 7, wherein the computer-implemented method further comprises:

eliminating one of the one or more tags when its corresponding string of characters are the same as another one of the one or more mapped tags.

9. The computer-implemented method of 2, wherein each one of the one or more categories are defined based on multiple sub-tags, and each one of the multiple sub-tags is defined based on a dimension defined for the strings of characters.

10. The computer-implemented method of 2, wherein the representation of the data objects includes multiple signatures, such that each one of the multiple signatures in the generated representation of the data object includes one or more of its corresponding strings of characters.

11. The computer-implemented method of 2, wherein the string of characters are and/or represent one or more keywords, and wherein the data object is or represents a document.

12. The computer-implemented method of 11, wherein the document is or represents one or more of: a job description, a resume, a profile, a criteria, and a matching criteria.

13. The computer-implemented method of 2, wherein the at least one tag is predefined, and wherein the representing of the data object further comprises:

representing the data object as a cluster of multiple tags, wherein each tag in the cluster includes at one of the string characters.

\* \* \* \* \*